United States Patent
Takeuchi et al.

(10) Patent No.: US 12,401,194 B2
(45) Date of Patent: Aug. 26, 2025

(54) ELECTRIC POWER CONTROL DEVICE

(71) Applicant: Miyawaki Kobo Co., Ltd., Nagano (JP)

(72) Inventors: Kesatoshi Takeuchi, Nagano (JP); Takahiro Mibu, Nagano (JP); Hideaki Takayanagi, Nagano (JP)

(73) Assignee: Miyawaki Kobo Co., Ltd., Nagano (JP)

( * ) Notice: Subject to any disclaimer, the term of this patent is extended or adjusted under 35 U.S.C. 154(b) by 126 days.

(21) Appl. No.: 18/555,316

(22) PCT Filed: Apr. 26, 2022

(86) PCT No.: PCT/JP2022/018817
§ 371 (c)(1),
(2) Date: Oct. 13, 2023

(87) PCT Pub. No.: WO2022/230849
PCT Pub. Date: Nov. 3, 2022

(65) Prior Publication Data
US 2024/0195170 A1    Jun. 13, 2024

(30) Foreign Application Priority Data

Apr. 28, 2021   (JP) ................. 2021-075717

(51) Int. Cl.
*H02J 1/12*    (2006.01)

(52) U.S. Cl.
CPC ..................... *H02J 1/12* (2013.01)

(58) Field of Classification Search
CPC ........ H02J 1/12; H02J 3/32; H02J 3/38; H02J 7/34; H02J 7/35
See application file for complete search history.

(56) References Cited

U.S. PATENT DOCUMENTS

2003/0002305 A1   1/2003  Takeuchi
2016/0172862 A1   6/2016  Nishigai

FOREIGN PATENT DOCUMENTS

| JP | 2002-320342 A | 10/2002 |
| JP | 2007-252146 A | 9/2007 |
| JP | 2016-208657 A | 12/2016 |
| JP | 2017-199413 A | 11/2017 |

*Primary Examiner* — Daniel Cavallari
(74) *Attorney, Agent, or Firm* — Global IP Counselors, LLP (57) ABSTRACT

The electric power control device includes N pieces of DC/DC converters provided corresponding to N pieces of power sources, a DC wiring connected in common to output terminals of the N pieces of DC/DC converters, a load connection unit connected to the DC wiring, and a power control unit connected to the N pieces of DC/DC converters. The power control unit sets an output voltage set value of at least one of the N pieces of DC/DC converters to a value different from output voltage set values of the other DC/DC converters, thereby supplying output power of one or more of the DC/DC converters to the power load unit with priority in decreasing order of the output voltage set values.

7 Claims, 11 Drawing Sheets

ELECTRIC POWER CONTROL DEVICE

CROSS REFERENCE TO RELATED APPLICATIONS

The present application claims the priority benefit of Japanese patent application No. 2021-75717, filed on Apr. 28, 2021. The entire contents of the application are incorporated herein by reference.

BACKGROUND

Field

The present disclosure relates to an electric power control device.

Related Art

JP2002-320342A discloses a power charging apparatus for collectively managing a plurality of types of power generation sources which fluctuate without any correlations between each other. The power charging apparatus performs charging to a charging medium, by controlling the output powers of the plurality of power generation sources to the same voltage and thereafter supplying the output powers to a charging unit.

SUMMARY

However, the prior art described above is not concerned with supplying power to a load unit which consumes power. Moreover, since the output powers of the plurality of power generation sources are controlled to have the same voltage, it may not be easy to effectively control the powers from the plurality of power generation sources when they include relatively stable power generation sources and unstable power generation sources.

The present disclosure has been made to solve at least some of the above-described problems, and may be embodied in the following aspects.

(1) According to an aspect of the present disclosure, there is provided an electric power control device for controlling supply of power from N pieces of power sources to a power load unit, the N being an integer equal to or greater than 2. The electric power control device comprises: N pieces of DC/DC converters provided corresponding to the N pieces of power sources, the DC/DC converters being configured to convert voltage levels of DC power derived from corresponding power sources; a DC wiring connected in common to output terminals of the N pieces of DC/DC converters; a load connection unit connected to the DC wiring, the load connection unit being configured to be connected to the power load unit; and a power control unit connected to the N pieces of DC/DC converters. The power control unit sets an output voltage set value of at least one of the N pieces of DC/DC converters to a value different from output voltage set values of the other DC/DC converters, thereby supplying the output power of one or more of the DC/DC converters to the power load unit with priority in decreasing order of the output voltage set values.

The electric power control device allows supply of power from one or more of the DC/DC converters to the power load unit with priority in decreasing order of the output voltage set values. Accordingly, some of the N pieces of power sources are used with priority to supply power to the power load unit, and this facilitates the control of the output power of the N pieces of power sources.

(2) The electric power control device may further comprise: an energy storage unit, the energy storage unit including a storage unit configured to store power supplied through the DC wiring as storage energy, and a power discharging DC/DC converter connected between the storage unit and the DC wiring, the power discharging DC/DC converter being configured to convert a voltage level of DC power derived from the storage energy. The power control unit may set an output voltage set value of the power discharging DC/DC converter to be lower than the output voltage set values of the N pieces of DC/DC converters, thereby supplying the output power of the power discharging DC/DC converter to the power load unit at a lower priority than the N pieces of DC/DC converters.

The electric power control device allows the setting of the output voltage set value of the power discharging DC/DC converter with a value lower than the output voltage set values of the N pieces of DC/DC converters, thereby supplying the output power of the N pieces of power sources to the power load unit at a higher priority than the output power of the energy storage unit.

(3) The electric power control device may further comprise: an external power line connection unit, the external power line connection unit including a power receiving AC/DC converter configured to convert AC power supplied through an external power line to DC power, and a power receiving DC/DC converter connected between the power receiving AC/DC converter and the DC wiring. The power control unit may set an output voltage set value of the power receiving DC/DC converter to be lower than the output voltage set values of the N pieces of DC/DC converters, thereby supplying the output power of the power receiving DC/DC converter to the power load unit at a lower priority than the N pieces of DC/DC converters.

The electric power control device allows the setting of the output voltage set value of the power receiving DC/DC converter with a value lower than the output voltage set values of the N pieces of DC/DC converters, thereby supplying the output power of the N pieces of power sources to the power load unit at a higher priority than the power supplied from the external power line connection unit.

(4) The electric power control device may further comprise: at least one of an energy storage unit configured to perform storage processing for storing power supplied through the DC wiring as storage energy, and power discharge processing for supplying power to the DC wiring by using the storage energy, and an external power line connection unit configured to perform power reception processing for receiving power from an external power line and supplying the power to the DC wiring, and power transmission processing for transmitting power supplied through the DC wiring to the external power line; and a voltage sensor configured to measure a voltage of the DC wiring. When the voltage of the DC wiring is equal to or higher than a first threshold which is set lower than any of the N pieces of the output voltage set values for the N pieces of DC/DC converters, the power control unit may determine that power consumption by the power load unit is less than a total value of output power of the N pieces of DC/DC converters, and allows consumption of surplus power corresponding to a difference between the power consumption and the total value of the output power by at least one of the storage processing of the energy storage unit and the power transmission processing of the external power line connection unit.

The electric power control device allows the determination of the surplus of power based on the comparison between the voltage of the DC wiring and the first threshold, and allows the consumption of the surplus power by using the energy storage unit and/or the external power line connection unit. This allows the control of power in a simple configuration.

(5) When the voltage of the DC wiring is lower than a second threshold which is set to be equal to or lower than the first threshold, the power control unit may determine that the power consumption by the power load unit is greater than the total value of the output power of the N pieces of DC/DC converters, and supplements shortage power corresponding to the difference between the power consumption and the total value of the output power by at least one of the power discharge processing of the energy storage unit and the power reception processing of the external power line connection unit.

The electric power control device allows the determination of the shortage of power based on the comparison between the voltage of the DC wiring and the second threshold, and allows the supplementation of the shortage power by using the energy storage unit and/or the external power line connection unit. This allows the control of power in a simple configuration.

(6) The power control unit may be connected to the N pieces of DC/DC converters via an addressable bus wiring, and the power control unit may individually send the output voltage set values to the N pieces of DC/DC converters via the bus wiring, by specifying addresses which are set in advance respectively to the N pieces of DC/DC converters.

The electric power control device allows the individual setting of the output voltage set values for the N pieces of DC/DC converters with arbitrary values.

(7) According to another aspect of the present disclosure, there is provided an electric power control device for controlling supply of power from N pieces of power sources to a power load unit, the N being an integer equal to or greater than 2. The electric power control device comprises: N pieces of DC/DC converters provided corresponding to the N pieces of power sources, the DC/DC converters configured to convert voltage levels of DC power derived from corresponding power sources; a DC wiring connected in common to output terminals of the N pieces of DC/DC converters; a load connection unit connected to the DC wiring, the load connection unit being configured to be connected to the power load unit; a power control unit connected to the N pieces of DC/DC converters; a voltage sensor configured to measure a voltage of the DC wiring; and at least one of an energy storage unit and an external power line connection unit, the energy storage unit being configured to perform storage processing for storing power supplied through the DC wiring as storage energy, and power discharge processing for supplying power to the DC wiring by using the storage energy, the external power line connection unit being configured to perform power reception processing for receiving power from an external power line and supplying the power to the DC wiring, and power transmission processing for transmitting power supplied through the DC wiring to the external power line. The power control unit is capable of individually setting output voltage set values of the N pieces of DC/DC converters, and when the voltage of the DC wiring is equal to or higher than a first threshold which is set lower than any of the N pieces of the output voltage set values for the N pieces of DC/DC converters, the power control unit determines that power consumption by the power load unit is less than a total value of output power of the N pieces of DC/DC converters, and allows consumption of surplus power corresponding to a difference between the power consumption and the total value of the output power, by at least one of the storage processing of the energy storage unit and the power transmission processing of the external power line connection unit.

The electric power control device allows the determination of the surplus of power based on the comparison between the voltage of the DC wiring and the first threshold, and allows the consumption of the surplus power by using the energy storage unit and/or the external power line connection unit. This allows the control of power in a simple configuration.

(8) When the voltage of the DC wiring is lower than a second threshold which is set to be equal to or lower than the first threshold, the power control unit may determine that the power consumption by the power load unit is greater than the total value of the output power of the N pieces of DC/DC converters, and supplements shortage power corresponding to the difference between the power consumption and the total value of the output power, by at least one of the power discharge processing of the energy storage unit and the power reception processing of the external power line connection unit.

The electric power control device allows the determination of the shortage of power based on the comparison between the voltage of the DC wiring and the second threshold, and allows the supplementation of the shortage power by using the energy storage unit and/or the external power line connection unit. This allows the control of power in a simple configuration.

DETAILED DESCRIPTION

Figure 1:
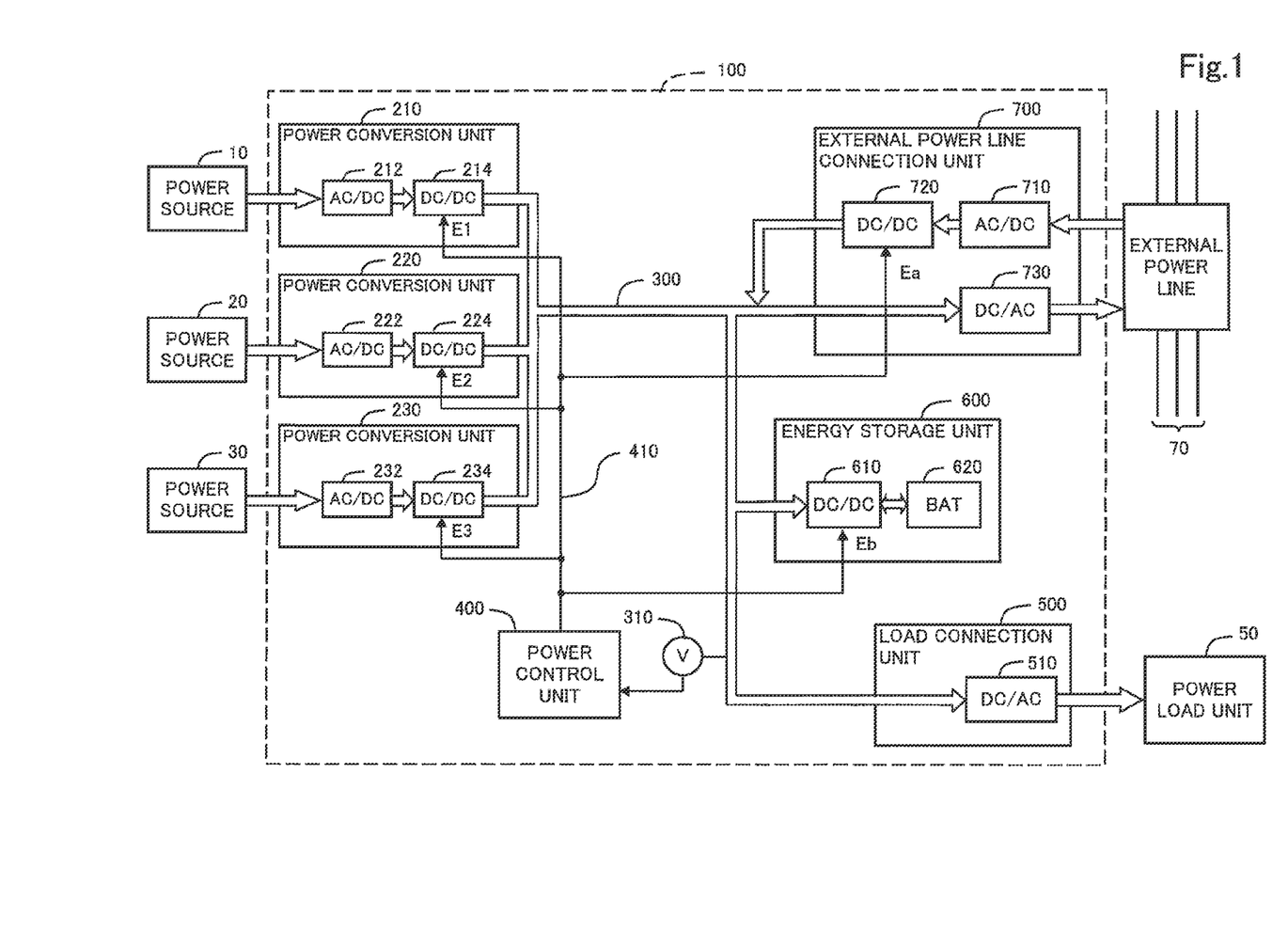
FIG. 1 is a block diagram illustrating the configuration of an electric power control device in a first embodiment.

FIG. 1 is an explanatory diagram illustrating the configuration of an electric power control device 100 in the first embodiment. The electric power control device 100 includes a plurality of power conversion units 210, 220, 230 connected to a plurality of external power sources 10, 20, 30, respectively, a DC wiring 300, a power control unit 400, a load connection unit 500 connected to an external power load unit 50, an energy storage unit 600, and an external power line connection unit 700 connected to an external power line 70. One or both of the energy storage unit 600 and the external power line connection unit 700 may be omitted.

Each of the plurality of power sources 10, 20, 30 is preferably a power generation device using renewable energy such as sunlight, wind power, or water power. Although the output power of such a power generation device using renewable energy fluctuates significantly over time, as will be described in detail below, The electric power control device 100 in the present embodiment is capable of easily controlling the fluctuating output power. As the power sources, other types of power generation devices such as a diesel generator may be used.

The first power conversion unit 210 includes an AC/DC converter 212 connected to the power source 10, and a DC/DC converter 214 connected to the output side of the AC/DC converter 212. Similarly, the second power conversion unit 220 includes an AC/DC converter 222 connected to the power source 20, and a DC/DC converter 224. The third power conversion unit 230 includes an AC/DC converter 232 connected to the power source 30, and a DC/DC converter 234. In the case where the number of the power conversion units 210, 220, 230 is set to N, the N may be an arbitrary integer equal to or greater than 2.

The DC wiring 300 is connected in common to the output terminals of the plurality of DC/DC converters 214, 224, 234 in the plurality of power conversion units 210, 220, 230. In other words, the plurality of DC/DC converters 214, 224, 234 are connected in parallel to the DC wiring 300. The DC wiring 300 is provided with a voltage sensor 310. The voltage measured by the voltage sensor 310 is sent to the power control unit 400.

Although the power control unit 400 is connected to the plurality of power conversion units 210, 220, 230, the load connection unit 500, the energy storage unit 600, and the external power line connection unit 700, some of these connection lines are omitted in FIG. 1. The processing performed by the power control unit 400 will be described later. Each of the power conversion units 210, 220, 230, the energy storage unit 600, and the external power line connection unit 700 may be provided with a power sensor for measuring power thereof so that the power measured by the power sensor is sent to the power control unit 400. It is noted that the processing for supplementing shortage power and the processing for consuming surplus power, which will be described later, may be performed without using a power sensor.

The load connection unit 500 has a DC/AC converter 510, and is capable of converting the DC power supplied through the DC wiring 300 into AC power, and supplying the AC power to the power load unit 50. It is noted that in the case where the power load unit 50 operates with DC power, the DC/AC converter 510 may be omitted, or may be replaced with a DC/DC converter.

The energy storage unit 600 is capable of performing storage processing for storing the power supplied through the DC wiring 300 as storage energy, and power discharge processing for supplying power to the DC wiring 300 by using the storage energy. The energy storage unit 600 includes a DC/DC converter 610 and a secondary battery 620. The DC/DC converter 610 is a bidirectional DC/DC converter, and serves as a part of the charge/discharge control unit of the secondary battery 620. The secondary battery 620 is a type of a storage unit which stores the power supplied through the DC wiring 300 as the storage energy. Instead of the secondary battery 620, another power storage device such as a capacitor may be served as the storage unit. Alternatively, a storage unit which stores other storage energy than electric power, such as a motor with a flywheel, may be used. In the latter case, in charge processing, the motor is driven and controlled to accelerate the rotation of the flywheel so as to mechanically convert the electric power into rotational motion energy for storage (or charging). In the power discharge processing, the motor is controlled for regenerative braking to decelerate the rotation of the flywheel so as to convert the rotational motion energy into electric power for regeneration (or power discharging). The DC/DC converter 610 is configured to convert the voltage level of the DC power derived from the storage energy in the storage unit in order to supply the DC power to the DC wiring 300, and may be referred to as a "power discharging DC/DC converter".

The external power line connection unit 700 is capable of performing power reception processing for receiving power from the external power line 70 and supplying the power to the DC wiring 300, and power transmission processing for transmitting the power supplied through the DC wiring 300 to the external power line 70. The external power line connection unit 700 has an AC/DC converter 710 which is connected to the external power line 70 and converts AC power into DC power, and a DC/DC converter 720 which is connected to the output side of the AC/DC converter 710. The DC/DC converter 720 is connected to the DC wiring 300. The AC/DC converter 710 is also referred to as a "power receiving AC/DC converter", and the DC/DC converter 720 is also referred to as a "power receiving DC/DC converter". The external power line connection unit 700 further has a DC/AC converter 730 which converts the DC power supplied through the DC wiring 300 into AC power and transmits the AC power to the power line 70. The DC/AC converter 730 is also referred to as a "power transmitting DC/AC converter".

The power control unit 400 is connected to the DC/DC converters 214, 224, 234, 610, 720 in The electric power control device 100, via an addressable bus wiring 410. The power control unit 400 is capable of individually sending and setting output voltage set values E1, E2, E3, Eb, Ea to the DC/DC converters 214, 224, 234, 610, 720, via the bus wiring 410, by specifying the addresses which are set in advance respectively. The DC/DC converters 214, 224, 234, 610, 720 output DC power at the output voltage set values E1, E2, E3, Eb, Ea, respectively. The power output to the DC wiring 300 is supplied to the power load unit 50 via the load connection unit 500.

Figure 2:
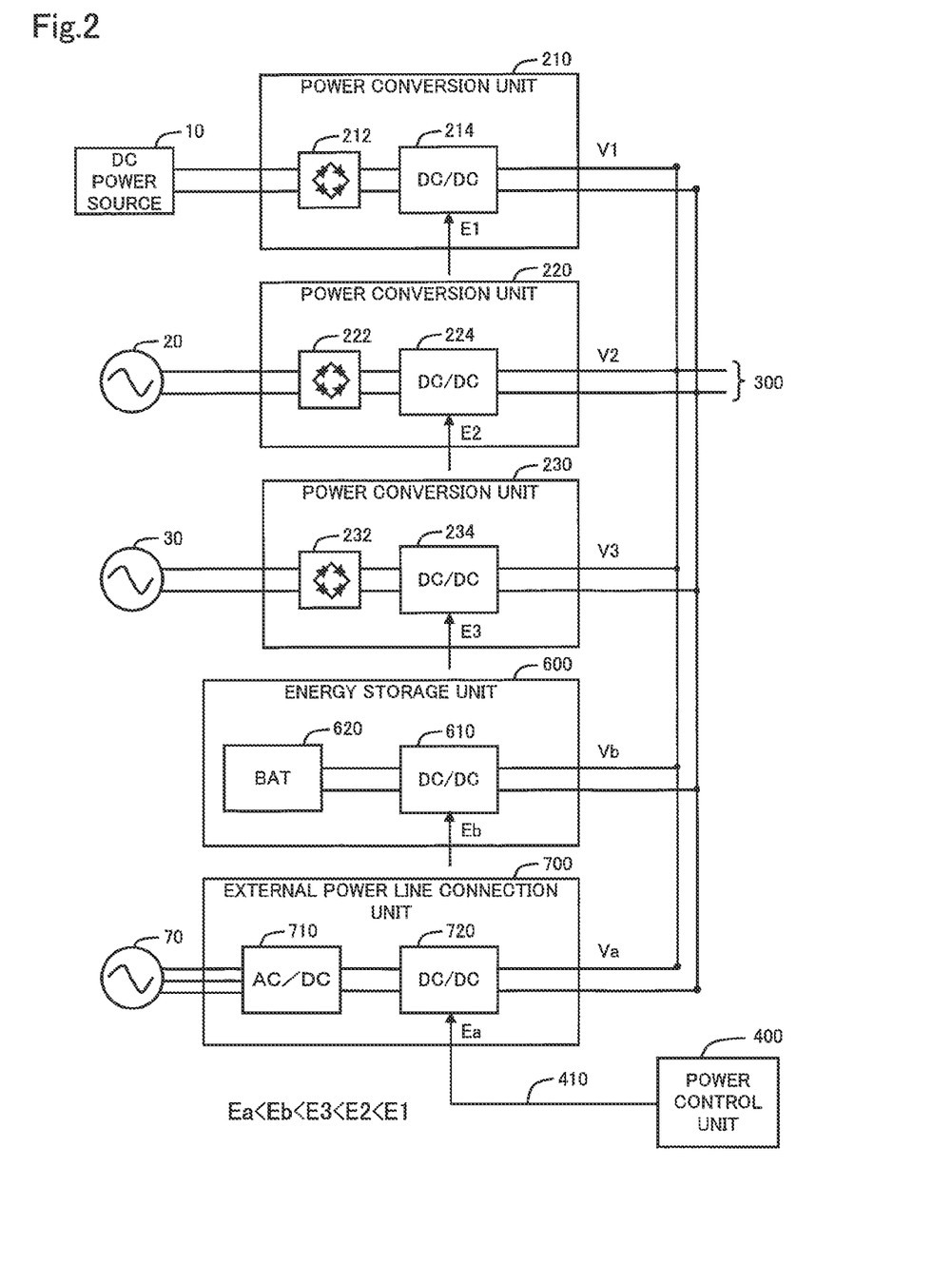
FIG. 2 is an explanatory diagram illustrating relations in connection of DC/DC converters and DC wiring.

FIG. 2 is an explanatory diagram illustrating the connection relations of the plurality of DC/DC converters 214, 224, 234, 610, 720 and the DC wiring 300. In the present example, the first power source 10 is a DC power source such as a solar panel. The DC output power of the first power source 10 is input into the AC/DC converter 212 of the first power conversion unit 210, and then input into the DC/DC converter 214 with substantially no change. In this case, the DC output power of the first power source 10 may be directly supplied to the DC/DC converter 214 by bypassing the AC/DC converter 212. The other power sources 20, 30 are AC power sources. The AC output power thereof is converted into DC power by the AC/DC converters 222, 232, respectively, and the converted DC power is then supplied to the DC/DC converters 224, 234, respectively. As understood from these descriptions, the DC/DC converters 214, 224, 234 perform processing for converting the voltage levels of the DC power derived from the corresponding power sources 10, 20, 30, respectively.

As described above, the power control unit 400 is capable of individually sending the output voltage set values E1, E2, E3, Eb, Ea to the DC/DC converters 214, 224, 234, 610, 720, via the bus wiring 410. In the present example, the output voltage set values E1, E2, E3, Eb, Ea are set to decrease in this order. In other words, the output voltage set value E1 of the DC/DC converter 214 which converts the voltage of the DC power derived from the first power source 10 is the largest, and the output voltage set value Ea of the DC/DC converter 720 which converts the voltage of the DC power derived from the external power line 70 is the smallest. The DC/DC converters 214, 224, 234, 610, 720 perform the operation of outputting DC power at the output voltage set values E1, E2, E3, Eb, Ea to the DC wiring 300, respectively. Output voltages V1, V2, V3 respectively of the power conversion units 210, 220, 230, an output voltage Vb of the energy storage unit 600, and an output voltage Va of the external power line connection unit 700 substantially coincide with the output voltage set values E1, E2, E3, Eb, Ea, respectively.

Although all of the output voltage set values E1, E2, E3 of the plurality of DC/DC converters 214, 224, 234 for power sources may be set to the same value, it is preferable to set at least one of the output voltage set values to a value different from the other output voltage set values, and it is more preferable to set the output voltage set values to all different values. When at least one of the output voltage set values E1, E2, E3 is set to a value different from the other output voltage set values, as will be described later, the output power of the DC/DC converters 214, 224, 234 is supplied to the power load unit 50 with priority in decreasing order of the output voltage set values.

It is preferable to set the output voltage set value Eb of the power discharging DC/DC converter 610 and the output voltage set value Ea of the power receiving DC/DC converter 720 to be lower than any of the output voltage set values E1, E2, E3 of the DC/DC converters 214, 224, 234 for power sources. Although the two of the output voltage set values Eb, Ea may be set to the same value, it is preferable to set the output voltage set value Eb for power discharge to be higher than the output voltage set value Ea for power reception.

Figure 3:
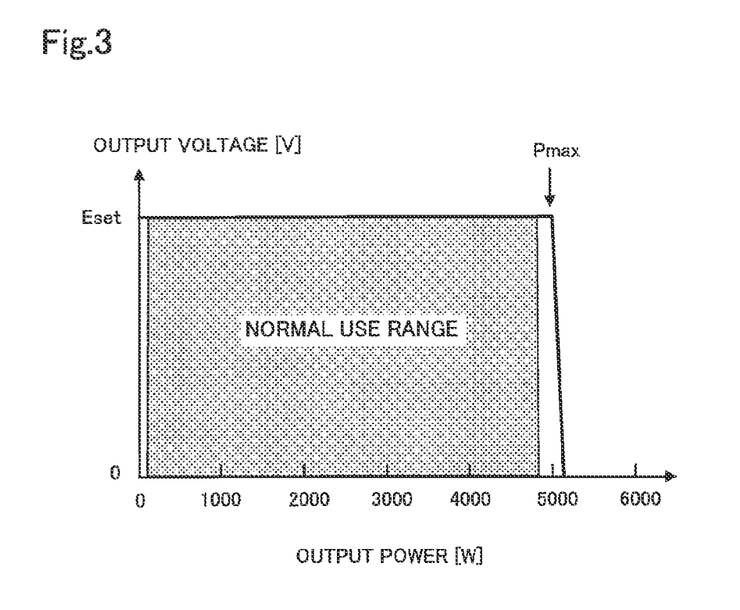
FIG. 3 is a graph illustrating normal output characteristics of the DC/DC converter.

FIG. 3 is a graph illustrating normal output characteristics of the DC/DC converter. In the present example, a maximum output power Pmax of the DC/DC converter is 5000 W. The maximum output power Pmax is also referred to as a "converter maximum output power Pmax". In the case where the output power is smaller than the converter maximum output power Pmax, the DC/DC converter outputs DC power at a voltage substantially equal to an output voltage set value Eset. In the case where the output power is in the range close to the converter maximum output power Pmax, it is preferable to perform current limitation by setting an output current limiter value. In the case where the output power is in the range close to 0, it is desirable to stabilize the output power by applying bias current of a no-load current. Within the normal use range, the DC/DC converter is capable of outputting DC power at a stable voltage.

Figure 4:
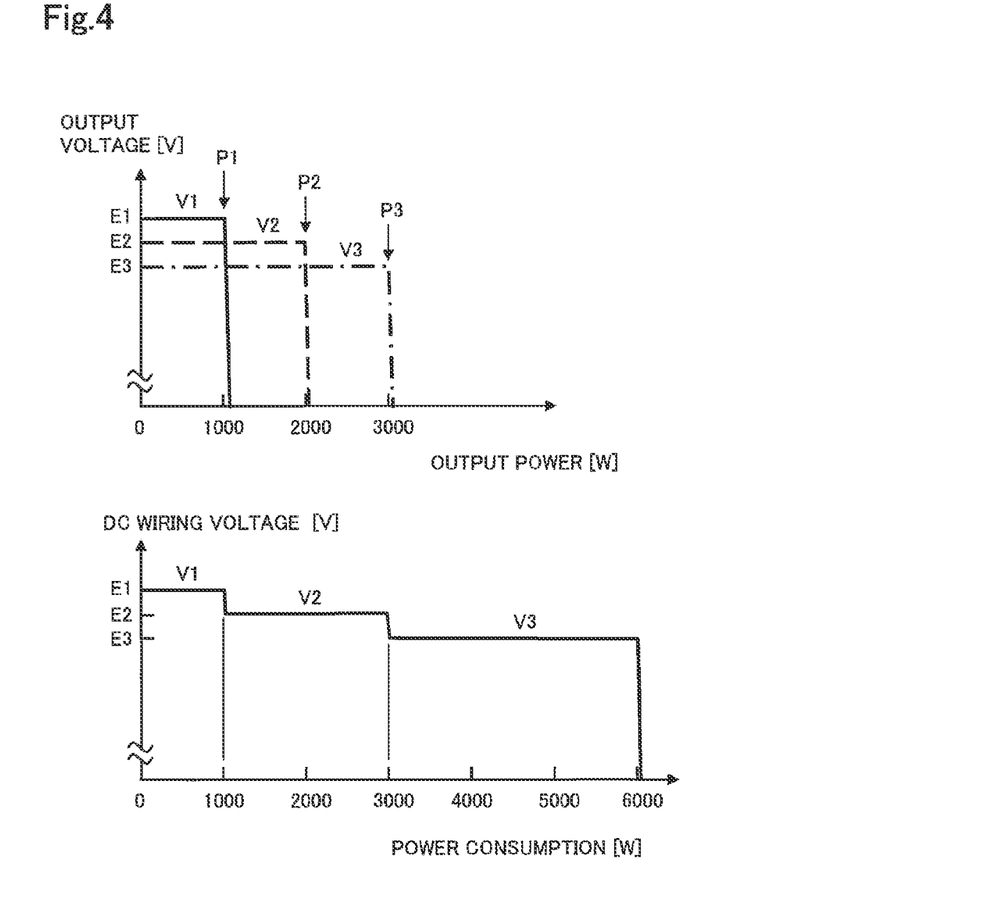
FIG. 4 is an explanatory diagram illustrating relations between output voltage values and output power of a plurality of power conversion units.

FIG. 4 is an explanatory diagram illustrating the relations between the output voltage values V1, V2, V3 and the output power of the power conversion units 210, 220, 230. In the example illustrated in the upper diagram, outputs P1, P2, P3 of the power sources 10, 20, 30 are 1000 W, 2000 W, 3000 W, respectively. In the case where power generation devices using renewable energy serve as the power sources 10, 20, 30, the outputs P1, P2, P3 fluctuate over time. The output voltage values V1, V2, V3 are constant values which are substantially equal to the respective output voltage set values E1, E2, E3, until they reach the outputs P1, P2, P3 of the power sources 10, 20, 30, and rapidly drop after they reach the outputs P1, P2, P3.

The lower diagram in FIG. 4 illustrates the relations between the power consumption by the power load unit 50 and the voltage value of the DC wiring 300. Until the power consumption reaches 1000 W, the voltage value of the DC wiring 300 is substantially equal to the output voltage value V1 of the first power conversion unit 210. In the case where the power consumption is in the range of 1000 W to 3000 W, the voltage value of the DC wiring 300 is substantially equal to the output voltage value V2 of the second power conversion unit 220. In the case where the power consumption is in the range of 3000 W to 6000 W, the voltage value of the DC wiring 300 is substantially equal to the output voltage value V3 of the third power conversion unit 230.

Figure 5:
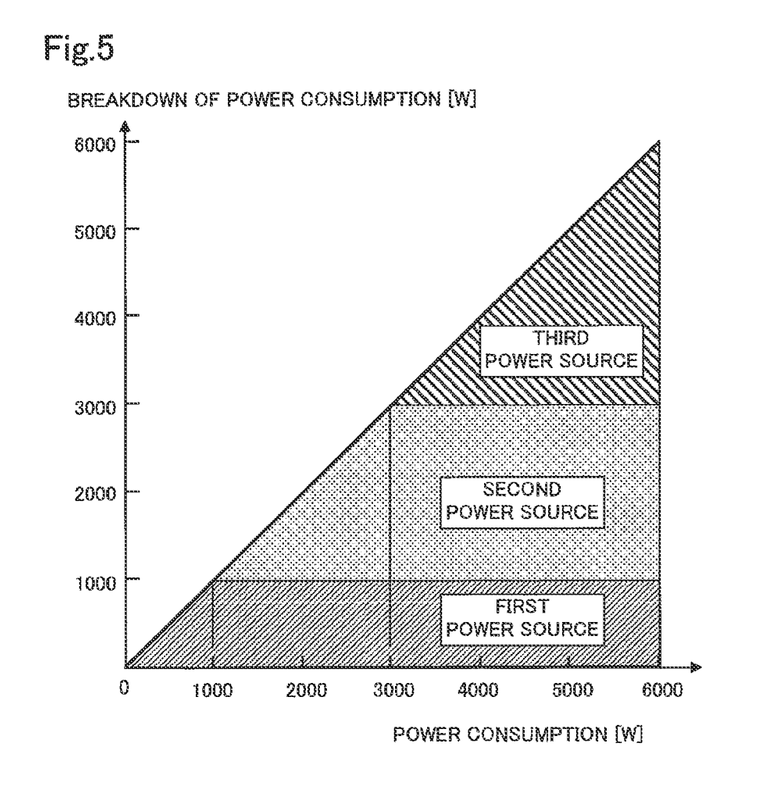
FIG. 5 is an explanatory diagram illustrating power consumption and its breakdown.

FIG. 5 is an explanatory diagram illustrating the power consumption by the power load unit 50 and its breakdown on the assumption of the characteristics in FIG. 4. Until the power consumption by the power load unit 50 reaches 1000 W, almost all of the power consumption is derived from the first power source 10. In the case where the power consumption is in the range of 1000 W to 3000 W, the power consumption is derived from the first power source 10 and the second power source 20. In the case where the power consumption is in the range of 3000 W to 6000 W, the power consumption is derived from the three power sources 10, 20, 30. As understood from these descriptions, in the first embodiment, the power control unit 400 sets all different values for the output voltage set values E1, E2, E3 of the DC/DC converters 214, 224, 234 which convert the voltage levels of the DC power derived from the plurality of power sources 10, 20, 30, thereby supplying the output power of one or more of the DC/DC converters 214, 224, 234 to the power load unit 50 with priority in decreasing order of the output voltage set values. As a result, some of the plurality of power sources 10, 20, 30 are used with priority to supply power to the power load unit 50, and this facilitates the control of the output power of the plurality of power sources 10, 20, 30 by performing the setting the output powers of the plurality of power sources 10, 20, 30 in accordance with climate change and seasonal change. Although it is not necessary to set all different values for the output voltage set values E1, E2, E3 of the plurality of DC/DC converters 214,

224, 234 for power sources, it is preferable to set the output voltage set value of at least one of the DC/DC converters to a value different from the output voltage set values of the other DC/DC converters.

Figure 6:
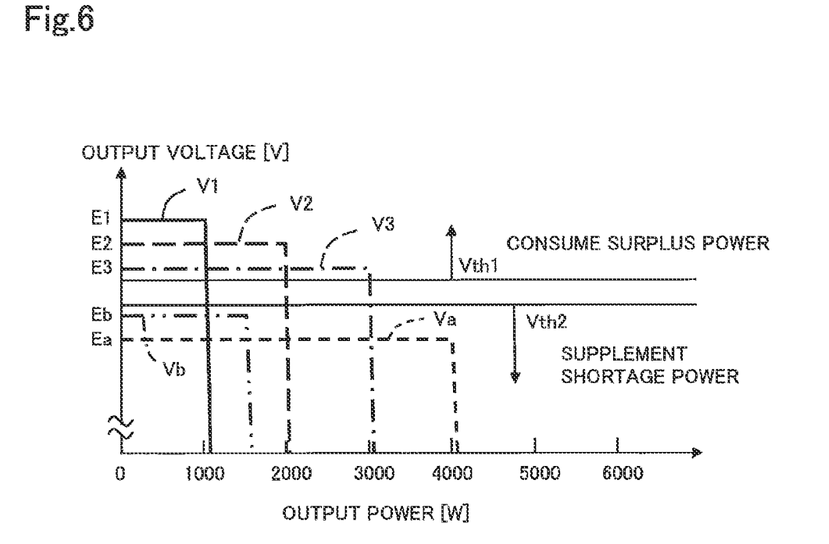
FIG. 6 is an explanatory diagram illustrating a method of determining whether surplus of power or shortage of power occurs based on a voltage of the DC wiring.

FIG. 6 is an explanatory diagram illustrating a method of determining whether a surplus of power or a shortage of power occurs based on a voltage of the DC wiring 300. In the present example, a first threshold Vth1 for determining whether surplus of power occurs, and a second threshold Vth2 for determining whether shortage of power occurs are set. The first threshold Vth1 is set in advance to a value lower than any of the output voltage set values E1, E2, E3 of the DC/DC converters 214, 224, 234 corresponding to the three power sources 10, 20, 30. The second threshold Vth2 is set in advance to a value equal to or lower than the first threshold Vth1. In the example illustrated in FIG. 6, the second threshold Vth2 is set to a value lower than the first threshold Vth1 and higher than the output voltage set value Eb of the power discharging DC/DC converter 610 and the output voltage set value Ea of the power receiving DC/DC converter 720.

The power control unit 400 is capable of performing one of the processing for consuming surplus power by power storing or power transmitting and the processing for supplementing shortage power by power discharging or power receiving, according to the voltage of the DC wiring 300 measured by the voltage sensor 310. In other words, in the case where the voltage of the DC wiring 300 is equal to or higher than the first threshold Vth1, the power control unit 400 determines that the power consumption by the power load unit 50 is less than the total value of the output power of the plurality of DC/DC converters 214, 224, 234 for power sources, and thus allows the consumption of the surplus power corresponding to the difference between the power consumption and the total value of the output powers, by at least one of the power storage processing (storage processing) of the energy storage unit 600 and the power transmission processing of the external power line connection unit. In the case where the voltage of the DC wiring 300 is lower than the second threshold Vth2, the power control unit 400 determines that the power consumption by the power load unit 50 is greater than the total value of the output powers of the plurality of DC/DC converters 214, 224, 234 for power sources, and allows the supplementation of the shortage power corresponding to the difference between the power consumption and the total value of the output powers, by at least one of the power discharge processing of the energy storage unit 600 and the power reception processing of the external power line connection unit 700. As described above, the power control unit 400 is capable of determining whether surplus of power or shortage of power occurs by measuring a voltage of the DC wiring 300, and is thereby capable of adjusting the surplus power or the shortage power by using the energy storage unit 600 and/or the external power line connection unit 700. This allows the control of power in a simple configuration.

The power control unit 400 may determine either one of the surplus of power or the shortage of power, not both, and may adjust the surplus power or the shortage power. Moreover, the power control unit 400, in order to consume the surplus power or to supplement the shortage power, may use either one of the energy storage unit 600 or the external power line connection unit 700, not both. In this case, the other may be omitted.

Figure 7:
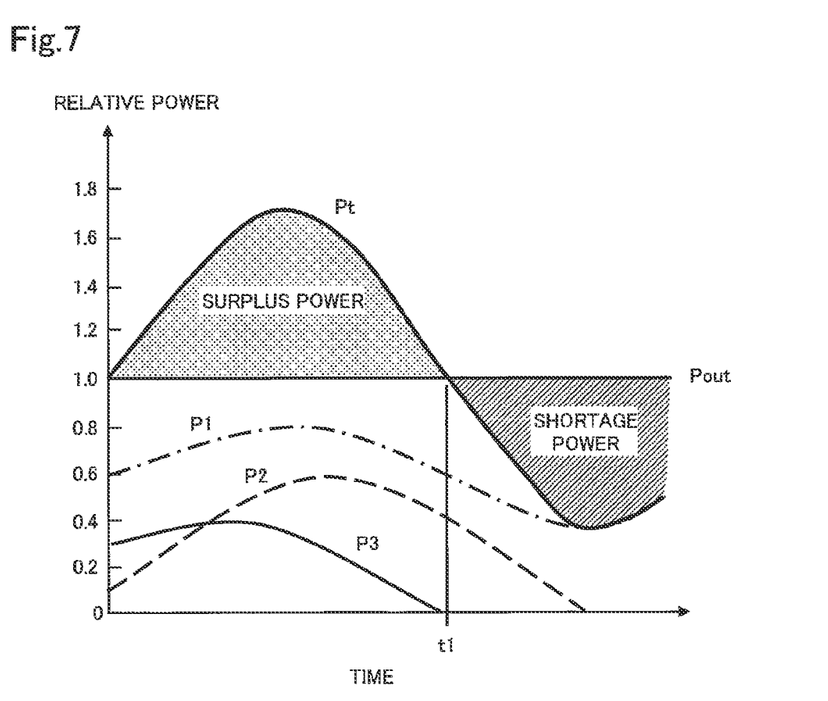
FIG. 7 is an explanatory diagram illustrating fluctuating output power of a plurality of power sources and examples of occurrence of the surplus and shortage of power.

FIG. 7 is an explanatory diagram illustrating the fluctuating output power of the plurality of power sources and examples of the occurrence of the surplus power and the shortage of power. The horizontal axis represents time, and the vertical axis represents relative power. In the present example, it is assumed that a power consumption Pout of the power load unit 50 is a constant value for simplicity of the description herein. Other power is illustrated relatively to the power consumption Pout set as 100%. The outputs P1, P2, P3 of the three power sources 10, 20, 30 fluctuate continuously over time. Until a time t1, a total value Pt of the outputs P1, P2, P3 of the three power sources 10, 20, 30 is greater than the power consumption Pout. Therefore, the surplus power corresponding to the difference between the total value Pt of the outputs P1, P2, P3 and the power consumption Pout is consumed by the power storage processing of the energy storage unit 600, or the power transmission processing of the external power line connection unit 700. On the other hand, in the period after the time t1, the total value Pt of the outputs P1, P2, P3 of the three power sources 10, 20, 30 is lower than the power consumption Pout. Therefore, the shortage power corresponding to the difference between the total value Pt of the outputs P1, P2, P3 and the power consumption Pout is supplemented by the power discharge processing of the energy storage unit 600 or the power reception processing of the external power line connection unit 700. In the present example, among the outputs P1, P2, P3 of the three power sources 10, 20, 30, the output P1 of the first power source 10 is the most stable and has minimal fluctuations. In this case, it is preferable to set the output voltage set value E1 of the DC/DC converter 214 corresponding to the first power source 10 to be higher than the output voltage set values E2, E3 of the other two DC/DC converters 224, 234.

As described above, in the first embodiment, the power control unit 400 individually sets the output voltage set values of the plurality of DC/DC converters 214, 224, 234 for power sources, thereby supplying the output power of one or more of the DC/DC converters to the power load unit 50 with priority in decreasing order of the output voltage set values. This allows the supply of power to the power load unit 50 by using some of the plurality of power sources 10, 20, 30 with priority, and facilitates the control of the output power of the plurality of power sources 10, 20, 30.

In the first embodiment, whether surplus of power or shortage of power occurs is determined according to a voltage of the DC wiring 300, and the surplus power or the shortage power is adjusted by using the energy storage unit 600 or the external power line connection unit 700. This allows the control of power in a simple configuration.

Figure 8:
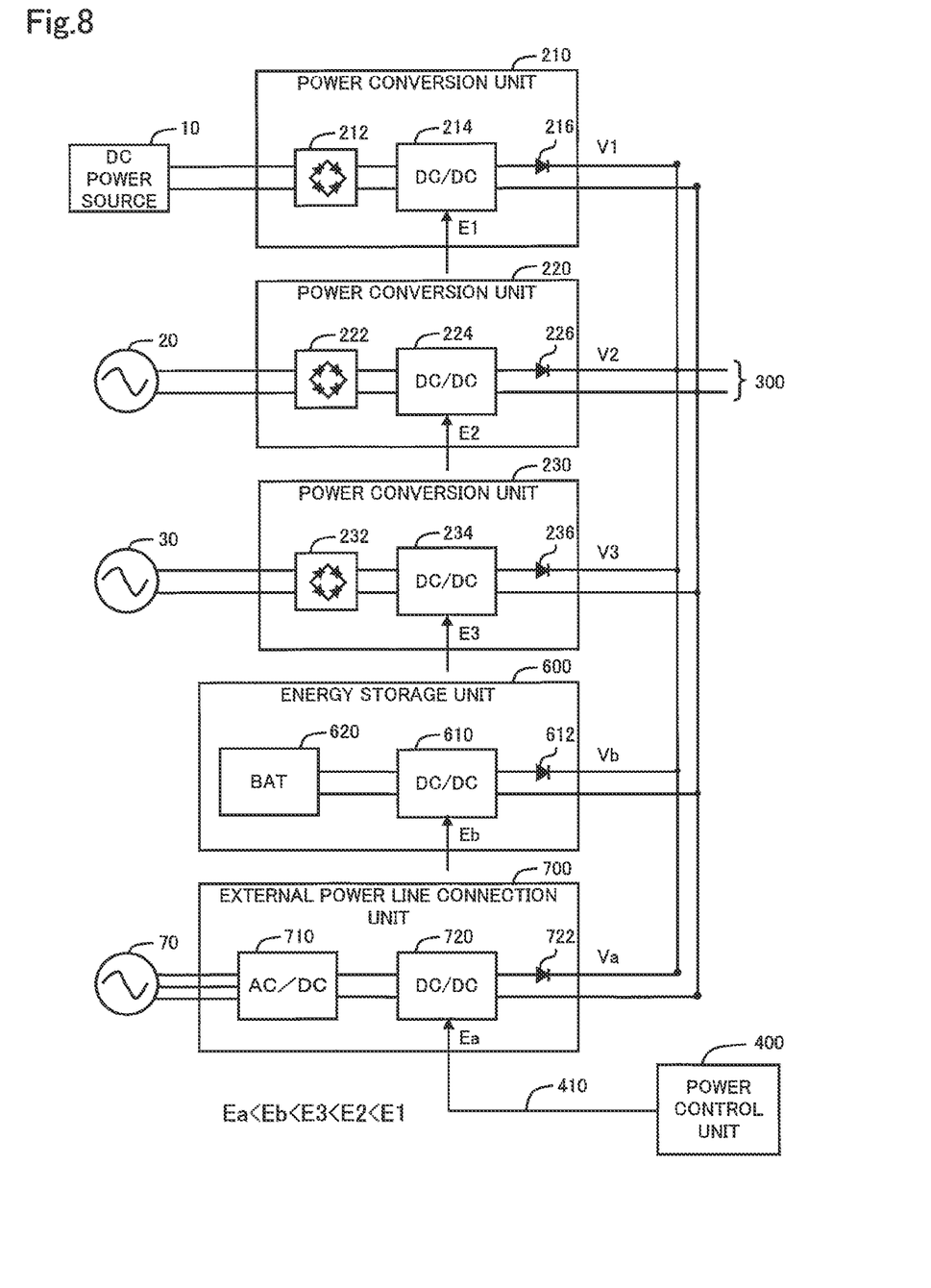
FIG. 8 is an explanatory diagram illustrating relations in connection of DC/DC converters and DC wiring in a second embodiment.

FIG. 8 is an explanatory diagram illustrating the connection relations of the plurality of DC/DC converters and the DC wiring in the second embodiment. The second embodiment is different from the first embodiment shown in FIG. 2 only in that backflow prevention elements 216, 226, 236, 612, 722 for protection are connected to the output elements of the DC/DC converters 214, 224, 234, 610, 720, respectively. The other configurations are the same as those in the first embodiment. The backflow prevention elements 216, 226, 236, 612, 722 may be implemented with rectifiers using diodes or MOSFETs, for example.

When the voltage drop caused by the backflow prevention elements 216, 226, 236, 612, 722 is not negligible, the voltages V1, V2, V3, Vb, Va at the output terminals of the backflow prevention elements 216, 226, 236, 612, 722 are lower than the output voltage set values E1, E2, E3, Eb, Ea of the DC/DC converters 214, 224, 234, 610, 720. The voltages V1, V2, V3 at the output terminals of the backflow prevention elements 216, 226, 236 correspond to the output voltage values of the power conversion units 210, 220, 230, respectively.

Figure 9:
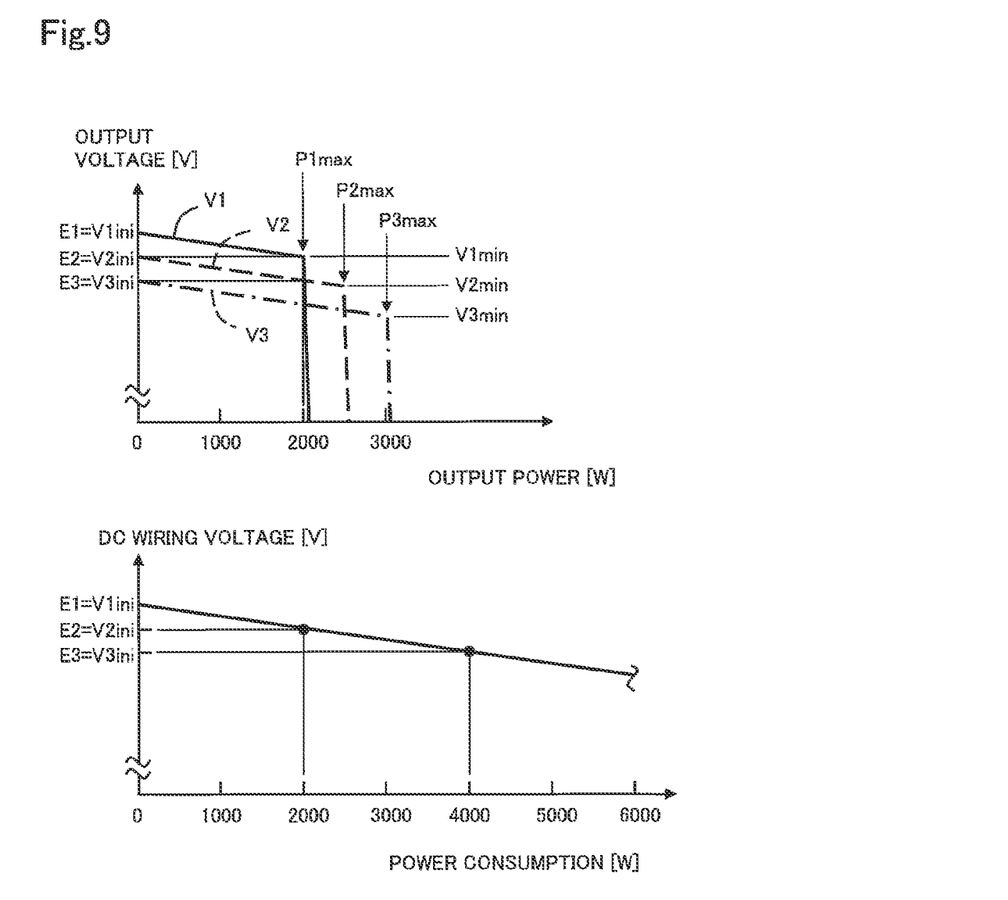
FIG. 9 is an explanatory diagram illustrating relations between output voltage values and output power of a plurality of power conversion units in the second embodiment.

FIG. 9 is an explanatory diagram illustrating the relations between the output voltage values V1, V2, V3 and the output power of the power conversion units 210, 220, 230 in the second embodiment, and corresponds to FIG. 4 in the first embodiment.

The upper diagram in FIG. 9 illustrates the case where the power sources 10, 20, 30 are at the maximum output powers P1max, P2max, P3max, respectively. These maximum output powers P1max, P2max, P3max are defined by the specifications of the power sources 10, 20, 30, respectively. In the present example, the maximum output powers P1max, P2max, P3max are 2000 W, 2500 W, 3000 W, respectively. The output voltage values V1, V2, V3 of the power conversion units 210, 220, 230 shown in FIG. 8 gradually decrease as the respective outputs increase. For example, the output voltage value V1 of the power conversion unit 210 is V1ini at a no-load state, and is V1min at the maximum output power P1max. The voltage V1ini at the no-load state is substantially equal to the output voltage set value E1 of the DC/DC converter 214. Similarly, the output voltage value V2 of the power conversion unit 220 is V2ini at the no-load state, and is V2min at the maximum output power P2max. The output voltage value V3 of the power conversion unit 230 is V3ini at the no-load state, and is V3min at the maximum output power P3max. In this case, as shown in the lower diagram of FIG. 9, the voltage value of the DC wiring 300 gradually decreases as the power consumption increases.

Figure 10:
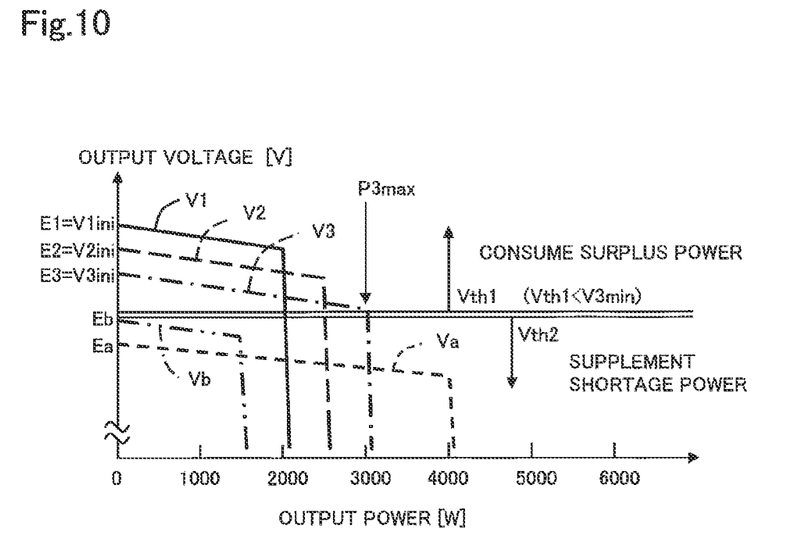
FIG. 10 is an explanatory diagram illustrating a method of determining whether surplus of power or shortage of power occurs based on a voltage of the DC wiring in the second embodiment.

FIG. 10 is an explanatory diagram illustrating a method of determining whether surplus of power or shortage of power occurs based on a voltage of the DC wiring 300 in the second embodiment, and corresponds to FIG. 6 in the first embodiment.

In the second embodiment, as with the first embodiment, the first threshold Vth1 for the power control unit 400 is set to determine whether surplus of power occurs, and the second threshold Vth2 for the power control unit 400 is set to determine whether shortage of power occurs. The first threshold Vth1 is set in advance to be lower than any of the minimum output voltage values V1min, V2min, V3min of the power conversion units 210, 220, 230 shown in FIG. 9. In the example of FIG. 9, since the minimum output voltage value V3min of the third power conversion unit 230 is the lowest, the first threshold Vth1 is set to a value lower than the minimum output voltage value V3min. The second threshold Vth2 is set in advance to be equal to or lower than the first threshold Vth1. In the example of FIG. 10, the second threshold Vth2 is set to be lower than the first threshold Vth1 and higher than the output voltage set value Eb for power discharge and the output voltage set value Ea of the power receiving DC/DC converter 720. Alternatively, the second threshold Vth2 may be set to another value.

The second embodiment has the same effects as those of the first embodiment described above. In the second embodiment, surplus of power or shortage of power may be determined and adjusted by taking into consideration the voltage drop occurring between the output terminals of the DC/DC converters 214, 224, 234 for power sources and the DC wiring 300.

Figure 11:
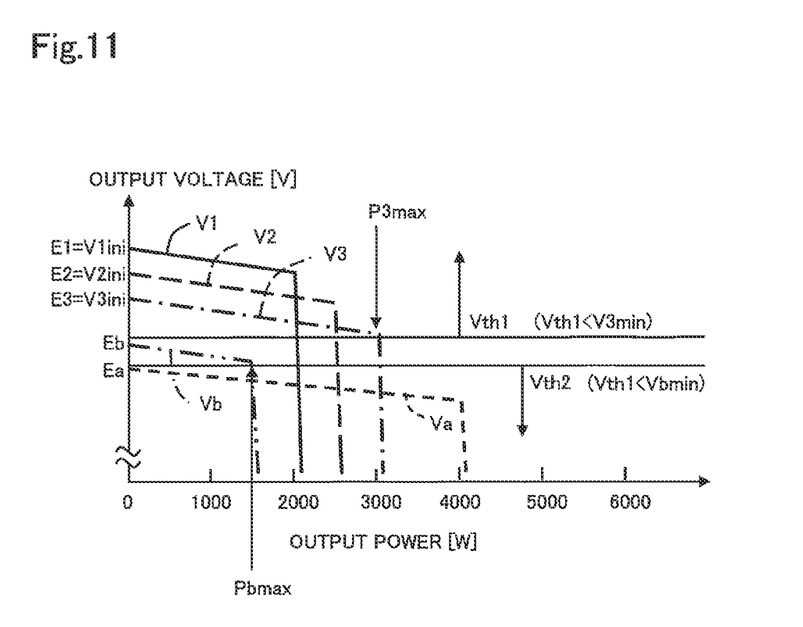
FIG. 11 is an explanatory diagram illustrating a method of determining whether surplus of power or shortage of power occurs based on a voltage of DC wiring in a third embodiment.

FIG. 11 is an explanatory diagram illustrating a method of determining whether surplus of power or shortage of power occurs based on a voltage of the DC wiring 300 in the third embodiment. The electric power control device in the third embodiment has the same configurations as those of The electric power control device in the second embodiment shown in FIG. 8, and has the same characteristics as those in FIG. 9. The third embodiment is different from the second embodiment, in the method of setting two thresholds Vth1, Vth2 and the method of using them.

As with the second embodiment, the first threshold Vth1 is set to be lower than V3min which is the lowest value among the minimum output voltage values V1min, V2min, V3min of the power conversion units 210, 220, 230. The second threshold Vth2 is set to be lower than a minimum output voltage value Vbmin of the energy storage unit 600 and higher than the output voltage set value Ea of the DC/DC converter 720 of the external power line connection unit 700. The minimum output voltage value Vbmin of the energy storage unit 600 is the voltage value at a maximum output power Pbmax defined by the specifications of the energy storage unit 600. In the third embodiment, power control is performed as follows.

(1) Since the output voltage set values E1, E2, E3, Eb, Ea of the DC/DC converters are set to decrease in this order, the voltage supplied to the DC wiring 300 is controlled in a self-excited manner. Even in the case where the total value of the power by the three power sources 10, 20, 30 and the power discharged by the energy storage unit 600 is lower than the power consumption by the power load unit 50, the shortage power is supplemented with the power supplied from the external power line connection unit 700.

(2) In the case where the voltage value of the DC wiring 300 is equal to or higher than the first threshold Vth1, the total value of the output powers of the three power sources 10, 20, 30 is higher than the power consumption by the power load unit 50, and thus the surplus power is consumed by the power storage processing (storage processing) of the energy storage unit 600.

(3) In the case where the voltage value of the DC wiring 300 is lower than the first threshold Vth1 and equal to or higher than the second threshold Vth2, although the power consumption by the power load unit 50 is greater than the total value of the output powers of the three power sources 10, 20, 30, the total value of the output power of the three power sources 10, 20, 30 and the power discharged by the energy storage unit 600 is greater than the power consumption by the power load part 50. Therefore, the surplus power is consumed by the power transmission processing of the external power line connection unit 700. In other words, a portion of the power discharged by the energy storage unit 600 is consumed by the power load unit 50, and the other portion is transmitted to the external power line 70. For example, in the case where the output powers of the three power sources 10, 20, 30 and the power consumption by the power load unit 50 become low at night, it is possible to sell power to the external power line 70 by use of the power discharge using the energy stored in the energy storage unit 600 in the daytime. Such processing is particularly effective in the case of the energy storage unit 600 having high energy storage capacity. Specifically, in the case of a motor with a flywheel serving as a storage unit, the storage unit is capable of storing a large amount of energy, and thus it is possible to sell power by use of the energy at night.

(4) In the case where the voltage value of the DC wiring 300 is lower than the second threshold Vth2, the power consumption by the power load unit 50 is greater than the total value of the output powers of the three power sources 10, 20, 30 and the power discharged by the energy storage unit 600. Therefore, the shortage power is supplemented by the power reception processing of the external power line connection unit 700.

The third embodiment also has the same effects as those in the first embodiment and the second embodiment described above. Also in the third embodiment, surplus of power or shortage of power may be determined and adjusted according to the comparison between the voltage value of the DC wiring 300 and the two thresholds Vth1, Vth2.

The electric power control device disclosed herein may be installed in any place of the surface of the earth, such as smart town (or future city), farm, home, factory, institution, park, desert, or marine. Especially, The electric power control device embedded underground is capable of preventing risks of disasters, such as an earthquake. In the case where The electric power control device disclosed herein is provided in a movable body (on the land, in air, or at sea) equipped with an electric motor serving as its main driving unit, similar effects are obtained even by using its main motor or its sub-motor as a power source other than natural energy. In this case, with a flywheel used in the energy storage unit, the inertia moment generated by the rotation of the flywheel becomes a harmful effect in traveling. Therefore, at least one flywheel is provided so as to rotate in a direction different from the traveling direction (rotates in a clockwise direction or a counterclockwise direction), thereby offsetting and preventing the inertia moment.

The present disclosure may be embodied in various configurations without departing from the spirit of the present disclosure, not limited to the above-described embodiments, examples, or modifications thereof. For example, the technical features in the embodiments, examples, and the modifications corresponding to the technical features in the respective aspects disclosed in the summary above may be appropriately replaced or combined in order to solve some or all of the above-described problems, or in order to achieve some or all of the above-described effects. Any of the technical features not described as essential in the present specifications may be omitted appropriately.

What is claimed is:

1. An electric power control device for controlling supply of power from N number of power sources to a power load unit, the N being an integer equal to or greater than 2, The electric power control device comprising:
    N number of DC/DC converters provided corresponding to the N number of power sources, the DC/DC converters being configured to convert voltage levels of DC power derived from corresponding power sources;
    a DC wiring connected in common to output terminals of the N number of DC/DC converters;
    a load connection unit connected to the DC wiring, the load connection unit being configured to be connected to the power load unit;
    a power control unit connected to the N number of DC/DC converters;
    a voltage sensor configured to measure a voltage of the DC wiring; and
    at least one of:
        an energy storage unit configured to perform storage power conversion for storing power supplied through the DC wiring as storage energy, and power discharge power conversion for supplying power to the DC wiring by using the storage energy, and
        an external power line connection unit configured to perform power reception power conversion for receiving power from an external power line and supplying the power to the DC wiring, and power transmission power conversion for transmitting power supplied through the DC wiring to the external power line,
    wherein the power control unit sets an output voltage set value of at least one of the N number of DC/DC converters to a value different from output voltage set values of the other DC/DC converters, thereby supplying the output power of one or more of the DC/DC converters to the power load unit with priority in decreasing order of the output voltage set values, and
    wherein when the voltage of the DC wiring measured by the voltage sensor is equal to or higher than a first threshold which is set lower than any of the N number of the output voltage set values for the N number of DC/DC converters, the power control unit determines that power consumption by the power load unit is less than a total value of output power of the N number of DC/DC converters, and allows consumption of surplus power corresponding to a difference between the power consumption and the total value of the output power by at least one of the storage power conversion of the energy storage unit and the power transmission power conversion of the external power line connection unit.

2. The electric power control device according to claim 1, further comprising:
    an energy storage unit, the energy storage unit including a storage unit configured to store power supplied through the DC wiring as storage energy, and a power discharging DC/DC converter connected between the storage unit and the DC wiring, the power discharging DC/DC converter being configured to convert a voltage level of DC power derived from the storage energy,
    wherein the power control unit sets an output voltage set value of the power discharging DC/DC converter to be lower than the output voltage set values of the N number of DC/DC converters, thereby supplying the output power of the power discharging DC/DC converter to the power load unit at a lower priority than the N number of DC/DC converters.

3. The electric power control device according to claim 1, further comprising:
    an external power line connection unit, the external power line connection unit including a power receiving AC/DC converter configured to convert AC power supplied through an external power line to DC power, and a power receiving DC/DC converter connected between the power receiving AC/DC converter and the DC wiring,
    wherein the power control unit sets an output voltage set value of the power receiving DC/DC converter to be lower than the output voltage set values of the N number of DC/DC converters, thereby supplying the output power of the power receiving DC/DC converter to the power load unit at a lower priority than the N number of DC/DC converters.

4. The electric power control device according to claim 1, wherein
    when the voltage of the DC wiring measured by the voltage sensor is lower than a second threshold which is set to be equal to or lower than the first threshold, the power control unit determines that the power consumption by the power load unit is greater than the total value of the output power of the N number of DC/DC converters, and supplements shortage power corresponding to the difference between the power consumption and the total value of the output power by at least one of the power discharge power conversion of the energy storage unit and the power reception power conversion of the external power line connection unit.

5. The electric power control device according to claim 1, wherein
the power control unit is connected to the N number of DC/DC converters via an addressable bus wiring,
the power control unit individually sends the output voltage set values to the N number of DC/DC converters via the bus wiring, by specifying addresses which are set in advance respectively to the N number of DC/DC converters.

6. An electric power control device for controlling supply of power from N number of power sources to a power load unit, the N being an integer equal to or greater than 2, The electric power control device comprising:
N number of DC/DC converters provided corresponding to the N number of power sources, the DC/DC converters configured to convert voltage levels of DC power derived from corresponding power sources;
a DC wiring connected in common to output terminals of the N number of DC/DC converters;
a load connection unit connected to the DC wiring, the load connection unit being configured to be connected to the power load unit;
a power control unit connected to the N number of DC/DC converters;
a voltage sensor configured to measure a voltage of the DC wiring; and
at least one of an energy storage unit and an external power line connection unit, the energy storage unit being configured to perform storage power conversion for storing power supplied through the DC wiring as storage energy, and power discharge power conversion for supplying power to the DC wiring by using the storage energy, the external power line connection unit being configured to perform power reception power conversion for receiving power from an external power line and supplying the power to the DC wiring, and power transmission power conversion for transmitting power supplied through the DC wiring to the external power line,
wherein the power control unit is capable of individually setting output voltage set values of the N number of DC/DC converters, and
when the voltage of the DC wiring measured by the voltage sensor is equal to or higher than a first threshold which is set lower than any of the N number of the output voltage set values for the N number of DC/DC converters, the power control unit determines that power consumption by the power load unit is less than a total value of output power of the N number of DC/DC converters, and allows consumption of surplus power corresponding to a difference between the power consumption and the total value of the output power, by at least one of the storage power conversion of the energy storage unit and the power transmission power conversion of the external power line connection unit.

7. The electric power control device according to claim 6, wherein
when the voltage of the DC wiring measured by the voltage sensor is lower than a second threshold which is set to be equal to or lower than the first threshold, the power control unit determines that the power consumption by the power load unit is greater than the total value of the output power of the N number of DC/DC converters, and supplements shortage power corresponding to the difference between the power consumption and the total value of the output power, by at least one of the power discharge power conversion of the energy storage unit and the power reception power conversion of the external power line connection unit.

* * * * *